US012558700B1

(12) United States Patent
Demurjian et al.

(10) Patent No.: US 12,558,700 B1
(45) Date of Patent: Feb. 24, 2026

(54) PUMP DISPENSER HAVING A SAFETY LOCK PUMP HEAD

(71) Applicant: Aspargo Laboratories, Inc., New York, NY (US)

(72) Inventors: Adam Demurjian, Red Bank, NJ (US); Andrew Chamlin, Sleepy Hollow, NY (US); Ani Demurjian, Red Bank, NJ (US)

(73) Assignee: ASPARGO LABORATORIES, INC., New York, NY (US)

( * ) Notice: Subject to any disclaimer, the term of this patent is extended or adjusted under 35 U.S.C. 154(b) by 0 days.

(21) Appl. No.: 19/199,715

(22) Filed: May 6, 2025

Related U.S. Application Data

(60) Provisional application No. 63/770,838, filed on Mar. 12, 2025.

(51) Int. Cl.
*B05B 11/10* (2023.01)
*B05B 11/00* (2023.01)

(52) U.S. Cl.
CPC ...... *B05B 11/1059* (2023.01); *B05B 11/0032* (2013.01)

(58) Field of Classification Search
CPC ........................ B05B 11/1059; B05B 11/0032
See application file for complete search history.

(56) References Cited

U.S. PATENT DOCUMENTS 3,907,174 A * 9/1975 Steiman .............. B05B 11/0094
222/321.3
4,434,914 A * 3/1984 Meshberg ........... F21V 33/0064
222/113
4,889,262 A * 12/1989 Toms ................... B67D 7/0211
222/321.9
6,932,244 B2 * 8/2005 Meshberg .............. B65D 83/22
222/548
7,487,891 B2 * 2/2009 Yerby ..................... B65D 83/46
222/402.11
7,775,402 B2 * 8/2010 Yoshida .............. B05B 11/1059
222/321.9
(Continued)

FOREIGN PATENT DOCUMENTS

CN 214190937 U 9/2021
WO 2008072833 6/2008
(Continued)

OTHER PUBLICATIONS

PCT/US2025/031933, International Search Report of the International Search Authority, Dec. 5, 2025.
(Continued)

*Primary Examiner* — Vishal Pancholi
(74) *Attorney, Agent, or Firm* — RISSO I.P.

(57) ABSTRACT

The present disclosure provides a pump dispenser having a safety lock pump head. The pump head serves as the safety lock and is connected to a container having a fluid therein. A pump assembly is attached with and between the container and pump head. Notably, the pump head has a locked configuration and an unlocked configuration, such that when in the locked configuration the pump head is locked and prohibited from dispensing the fluid. Alternatively, in the unlocked configuration, the pump head is operable for engaging with and actuating the pump assembly to dispense fluid from the container.

13 Claims, 10 Drawing Sheets

(56) References Cited

U.S. PATENT DOCUMENTS

| | | | | |
|---|---|---|---|---|
| 7,874,461 | B2 * | 1/2011 | Bae | B05B 11/1069 222/321.9 |
| 8,308,029 | B2 * | 11/2012 | Ki | B05B 11/0027 222/321.9 |
| 8,439,230 | B2 * | 5/2013 | Hagen | B05B 11/106 222/384 |
| 8,695,852 | B2 * | 4/2014 | Bertin | B05B 11/0032 222/402.11 |
| 9,010,581 | B2 * | 4/2015 | Presche | B05C 11/00 222/384 |
| 9,277,797 | B2 * | 3/2016 | Chen | A45D 34/00 |
| 10,595,685 | B2 * | 3/2020 | Falcon | B05B 11/02 |
| 10,752,412 | B1 * | 8/2020 | Hawry | B05B 11/1047 |
| 2003/0038146 | A1 * | 2/2003 | Meshberg | B05B 11/1059 222/321.9 |
| 2009/0302062 | A1 * | 12/2009 | Maddy | B05B 11/1059 222/153.13 |

FOREIGN PATENT DOCUMENTS

| | | |
|---|---|---|
| WO | 2010121264 | 10/2010 |
| WO | 2014078478 | 5/2014 |

OTHER PUBLICATIONS

PCT/US2025/031933, Written Opinion of the International Search Authority, Dec. 5, 2025.

* cited by examiner

100

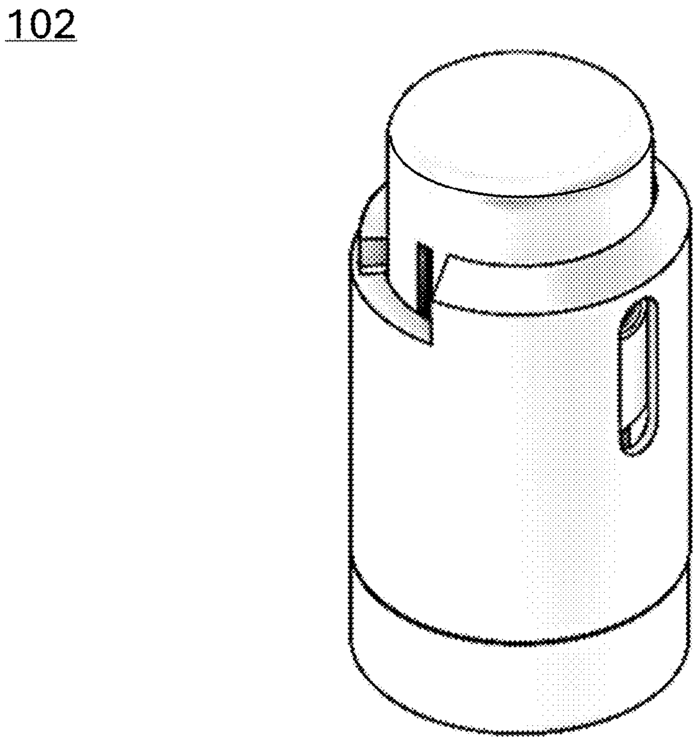
FIG. 6A
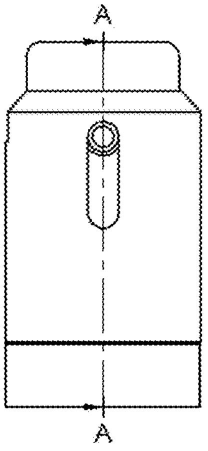
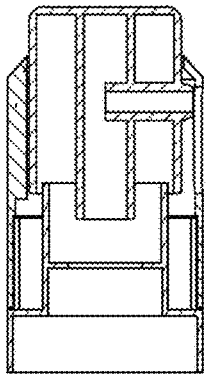
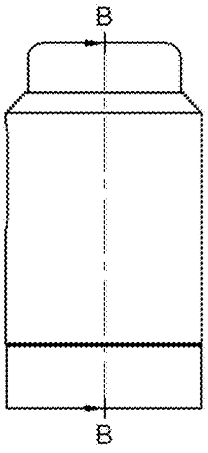
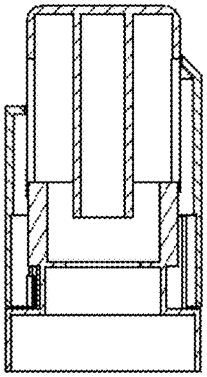
FIG. 6B FIG. 6C FIG. 6D FIG. 6E

PUMP DISPENSER HAVING A SAFETY LOCK PUMP HEAD

CROSS-REFERENCE TO RELATED APPLICATIONS

This is a non-provisional application of U.S. Provisional Application No. 63/770,838, filed Mar. 12, 2025, the entirety of which is incorporated herein by reference.

BACKGROUND OF THE INVENTION

(1) Field of Invention

The present invention relates to medication containers and, more particularly, to a pump dispenser having a security or safety lock pump head that is configured to pump a dose of fluid or medicine after selectively unlocking the pump head.

(2) Description of Related Art

Medication containers are typically used to contain some form of medicine, whether it be in tablet or fluid form. In fluid form, medicine can be dispensed as an atomized spray for inhalation or within the naval cavity. While convenient due to the ease of spray, it is crucial that medicine only be administered to those for which it is prescribed. Notably, children need to be prevented from inadvertently using or pumping medicine from such a spray container.

Thus, a continuing need exists for a new and improved pump dispenser having a security feature to prevent children or others from accessing or otherwise spraying the medicine contained therein.

SUMMARY OF INVENTION

The present invention relates to medication containers and, more particularly, to a pump dispenser having a security or safety lock cap (i.e., pump head) that is configured to pump a dose of fluid or medicine after selectively unlocking the pump head. The pump head serves as a safety lock cap and is connected to a container having a fluid therein. A pump assembly is attached with and between the container and pump head. Notably, the pump head has a locked configuration and an unlocked configuration, such that when in the locked configuration the pump head is locked and prohibited from dispensing the fluid. Alternatively, in the unlocked configuration, the pump head is operable for engaging with and actuating the pump assembly to dispense fluid from the container.

In another aspect, the pump head comprises a base component, an actuator component slidably connected to the base component. An outer shell is rotatably connected to the base component and actuator component.

In yet another aspect, the base component includes one or more base slots and an inner wall of the outer shell includes one or more locking ribs, such that each locking rib resides within a base slot in the locked configuration.

In yet another aspect, the outer shell includes one or more depressible portions, such that upon depression of the depressible portions, each locking rib is withdrawn from the base slot to allow a user to selectively rotate the outer shell to transition from the locked configuration to the unlocked configuration.

Further, the outer shell includes a blocking ledge and the actuator component includes a blocking latch that selectively resides upon the blocking ledge, wherein when upon the blocking ledge, the actuator component is in the locked configuration and prevented from being depressed to actuate the pump assembly.

In another aspect, the outer shell includes a vertical channel adjacent to the blocking ledge, such that when the outer shell is rotated into the unlocked configuration, the blocking ledge is rotated away from the blocking latch such that the blocking latch is aligned with the vertical channel to allow for selective pumping of the actuator component.

In yet another aspect, the base component includes one or more alignment guides that align and engage with corresponding alignment slots on the actuator component, such that the alignment guides prevent the actuator component from rotating with respect to the base component while allowing a sliding relationship between the actuator component and the base component.

Further and in another aspect, the base component also includes a pair of opposing deform guards separated by a deform gap that allows for deformation of the outer shell to selectively unlock the pump head.

In yet another aspect, the one or more base slots are formed through the pair of opposing deform guards.

Finally, the present invention also includes a method for forming and using the pump dispenser as described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6A is an elevated-view illustration of a pump head in accordance with various embodiments of the present invention, depicting the pump head in an unlocked configuration, ready to be depressed and pumped;

FIG. 6B is a front-view illustration of the pump head in accordance with various embodiments of the present invention;

FIG. 6C is a cross-sectional, side-view illustration of the pump head, taken from line A-A of FIG. 6B;

FIG. 6D is a left, side-view illustration of the pump head in accordance with various embodiments of the present invention;

FIG. 6E is a cross-sectional, side-view illustration of the pump head, taken from line B-B of FIG. 6D;

DETAILED DESCRIPTION

Figure 1A:
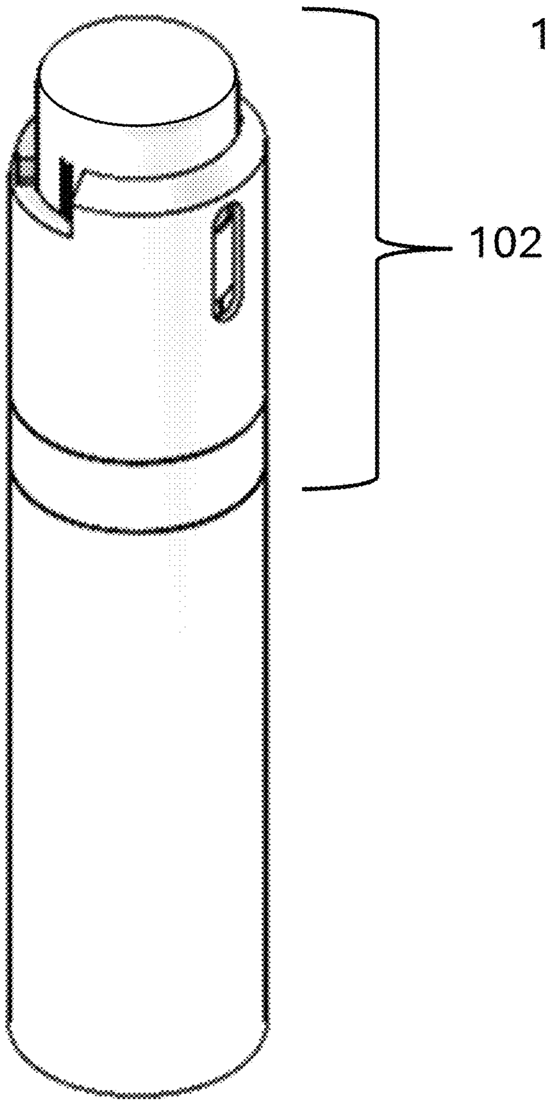
FIG. 1A is an elevated-view illustration of a pump dispenser in accordance with various embodiments of the present invention.

The present disclosure is directed to a pump dispenser having a security or safety lock pump head (cap) that is configured to pump a dose of fluid or medicine after selectively unlocking the pump head. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

The present disclosure provides a pump dispenser having a security or safety lock pump head that is configured to pump a dose of fluid or medicine after selectively unlocking the pump head. Specifically and in various embodiments, the invention is a pump dispenser that can be used to dispense a variety of fluids, such as medicine. In various embodiments, the pump dispenser includes a traditional pump assembly that can be used to pump fluid or liquid medicine as a spray that can be sprayed into a user's mouth (or on their skin, etc.). Any traditional pump/spray assembly can be used; however, the innovation here is the safety lock cap (i.e., the pump head) that is incorporated into the pump dispenser. The safety lock pump head prevents inadvertent dispensing as well as requiring a certain level of skill to prevent children from using and pumping the medicine or fluid from the dispenser. Further details are provided below.

Figure 1B:
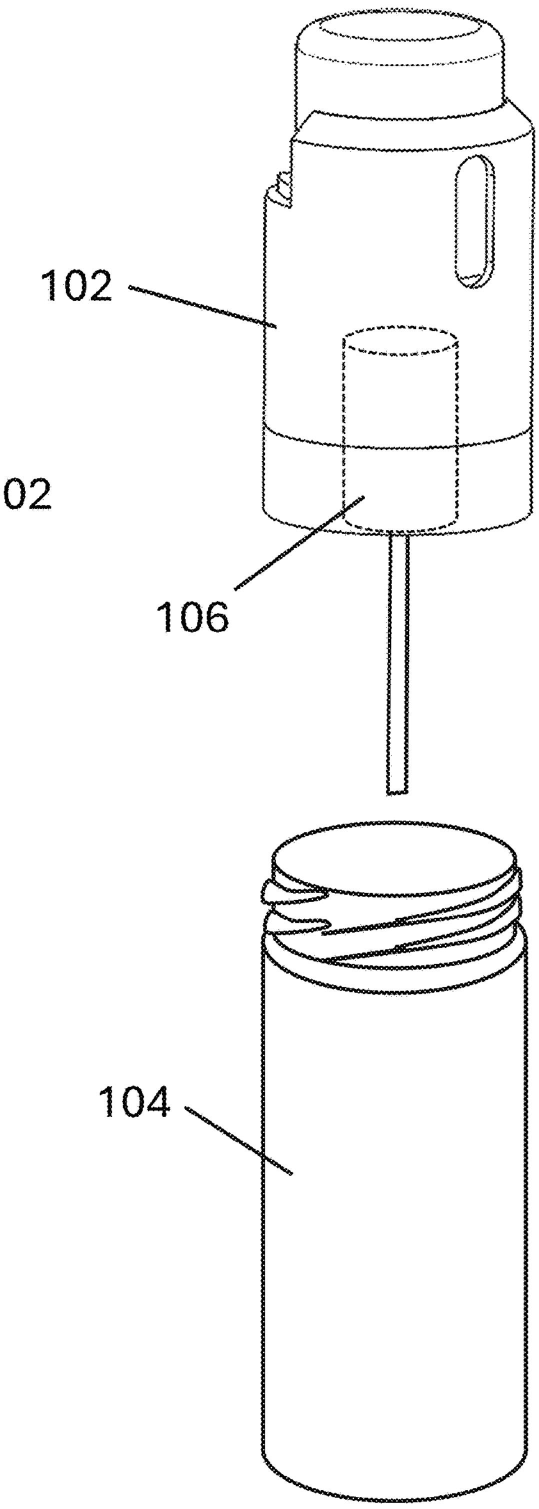
FIG. 1B is an illustration of the pump dispenser in accordance with various embodiments of the present invention.

As shown in FIGS. 1A and 1B, the pump dispenser 100 includes a unique safety lock pump head 102. Connected with the pump head 102 is a container 104 for holding the fluid or medicine that is dispensed from the pump head 102. Also included is a pump assembly 106 that, when actuated by the pump head 102, draws the fluid or medicine from the container 104 and through the pump head 102 for delivery.

Figures 2A, 2B, 2C:
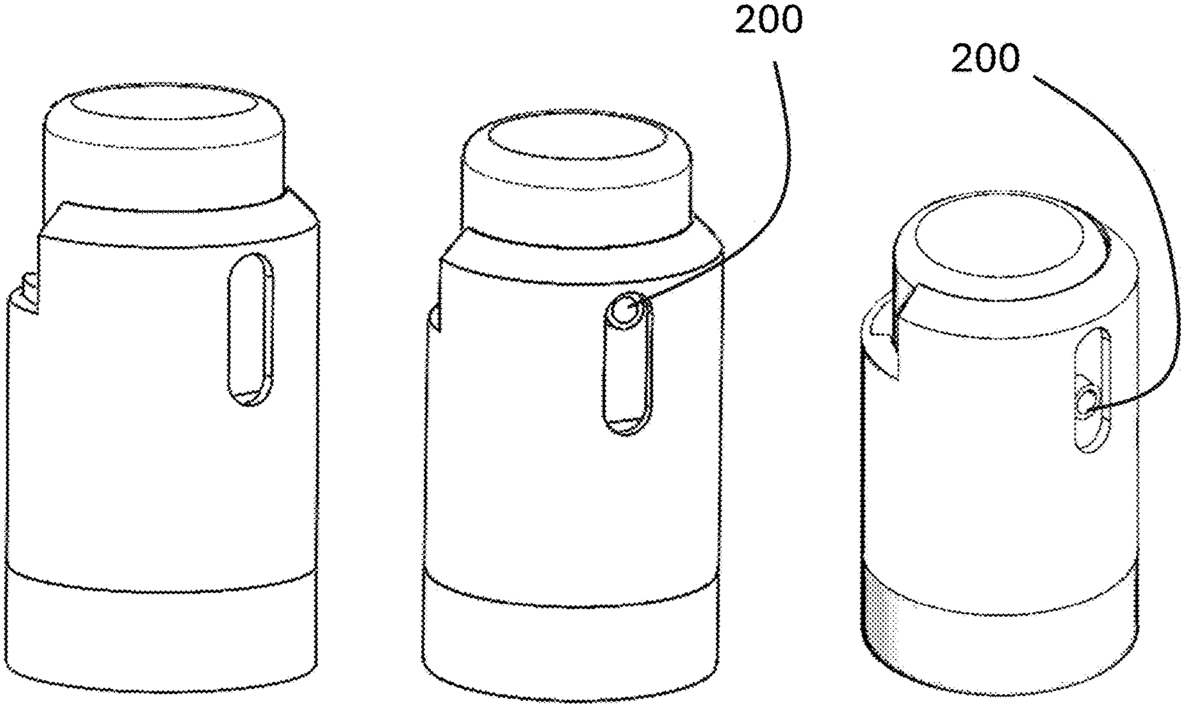
FIG. 2A is an elevated-view illustration of a pump head in accordance with various embodiments of the present invention, depicting the pump head in a locked configuration.
FIG. 2B is an elevated-view illustration of the pump head in accordance with various embodiments of the present invention, depicting the pump head in an unlocked configuration, ready to be depressed and pumped.
FIG. 2C is an elevated-view illustration of the pump head in accordance with various embodiments of the present invention, depicting the pump head in an unlocked configuration and fully depressed.
Figure 3A:
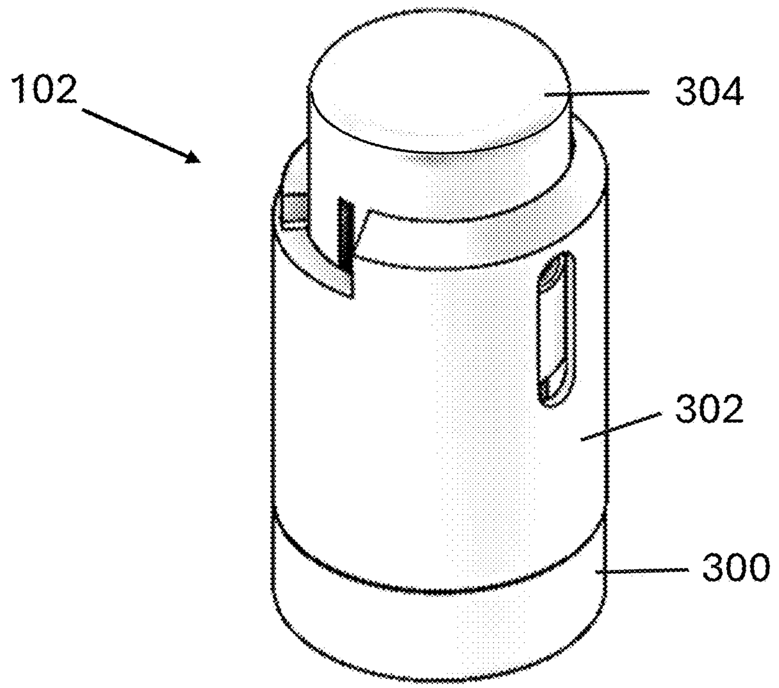
FIG. 3A is an elevated-view illustration of the pump head in accordance with various embodiments of the present invention, depicting the pump head in an unlocked configuration, ready to be depressed and pumped.
Figure 3B:
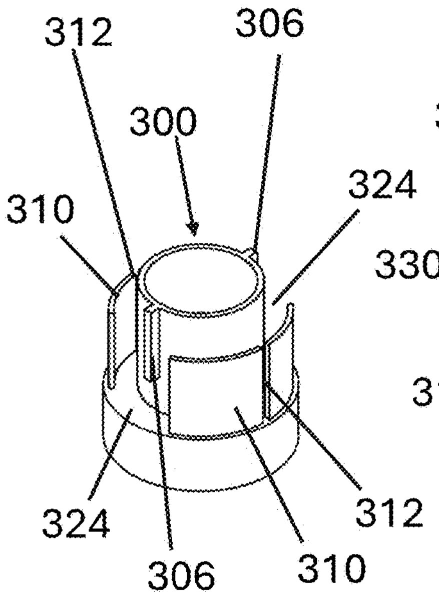
FIG. 3B is an elevated-view illustration of a base component of the pump head.
Figure 3C:
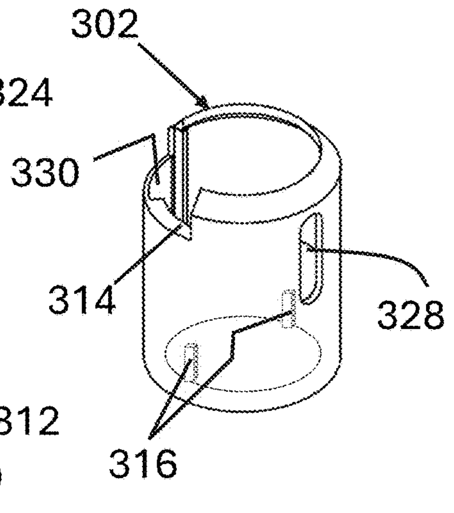
FIG. 3C is an elevated-view illustration of an outer shell component of the pump head.
Figure 3D:
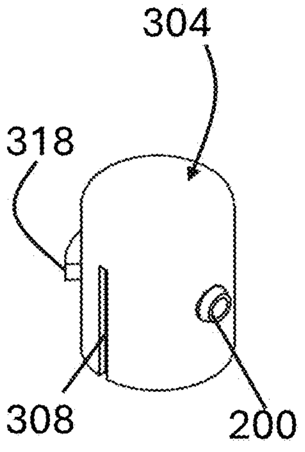
FIG. 3D is an elevated-view illustration of an actuator component of the pump head.

Importantly and as noted above, the pump head 102 includes a security feature to prevent children or others from accessing or otherwise spraying the medicine contained within the pump dispenser 100. For reference, FIG. 2A is an illustration of the pump head 102 in a locked configuration, while FIG. 2B is an illustration of the pump head 102 in an unlocked configuration, ready to be depressed and pumped (show in FIG. 2C). Thus, while in the locked configuration, the pump head 102 cannot be actuated to pump fluid from the dispenser. Alternatively and as can be appreciated by those skilled in the art, the unlocked configuration allows for selective actuation and pumping of the pump head 102 to dispense the fluid from the dispenser and dispensing aperture 200.

Referring again to FIG. 1B, it should be noted that the pump head 102 can be affixed with the container 104 using any suitable technique. While depicted as being screwed thereon, the invention is not intended to be limited thereto as some embodiments require that the container 104 be permanently affixed to the pump head 102 to prevent access to the contents therein. For example, the container 104 can be glued, press fit, plastic wielded, or otherwise sealed against the pump head 102 to prevent inadvertent access to the fluid when the pump head 102 is the locked configuration.

Innovation in the present disclosure lays in the unique safety lock pump head 102 that allows for selective transition between the locked and unlocked configurations. This feature can be accomplished using any suitable mechanism or device that prevents children or the uninitiated from transitioning the pump head 102 between the two configurations. For example and as shown in FIGS. 3A through 3D, the pump head 102 comprises a base component 300, an outer shell 302, and an actuator component 304. As described in further detail below, each of the pump head 102 components (i.e., the base component 300, outer shell 302, and actuator component 304) the work together to control transition between the locked and unlocked configurations The base component 300 includes one or more alignment guides 306 (e.g., ridges) that align and engage with corresponding alignment slots 308 on the actuator component 304. The alignment guides 306 prevent the actuator component 304 from rotating with respect to the base component 300 while still allowing a sliding relationship between the two components 306 and 304. In other words, the actuator component 304 is prohibited from rotating with respect to the base component 300 while still being pumpable. The base component 300 also includes a pair of opposing deform guards 310, where each deform guard 310 includes a base slot 312 formed therethrough. Separating each deform guard 310 is a deform gap 324 that allows for deformation of the outer shell 302 to selectively unlock the pump head 102 (as will be described in further detail below).

The outer shell 302 is formed to attach with and surround portions of both the base component 300 and the actuator component 304. Notably, the outer shell 302 includes a blocking ledge 314 that is formed to selectively lock against a blocking latch 318 formed on the actuator component 304. The outer shell 302 also includes one or more locking ribs 316 (e.g., on opposing sides) that protrude from inner walls into the outer shell 302. The locking ribs 316 are formed to selectively lock into the base slots 312 of the base component 300 to prevent the outer shell 302 from rotating with respect to the base component 300 when in the locked configuration. As described further below, the outer shell 302 also includes a dispenser slide slot 328 to slidably accommodate the dispensing aperture 200 when in the unlocked configuration.

Figure 4A:
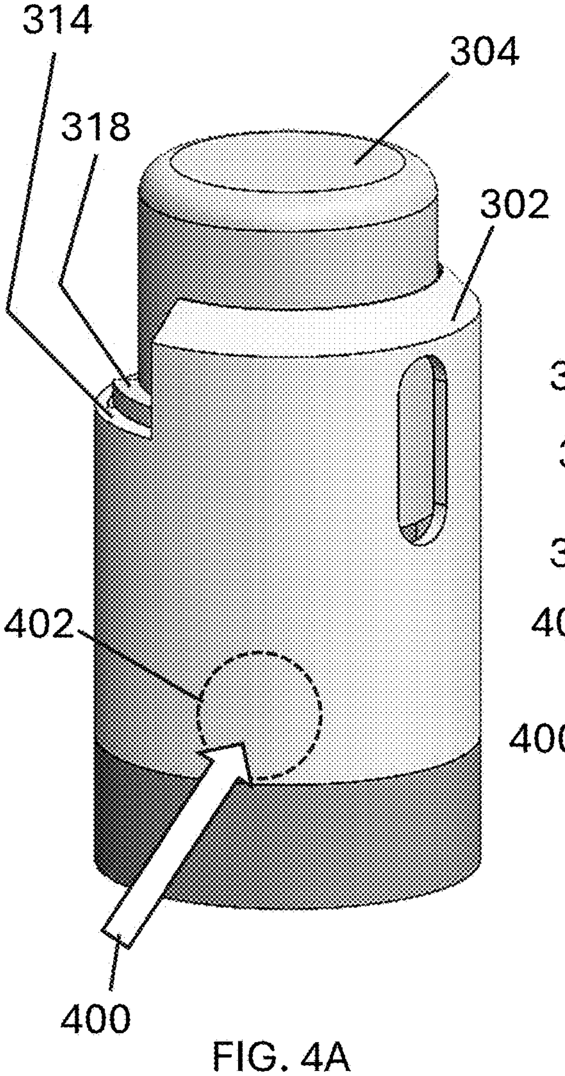
FIG. 4A is an elevated-view illustration of a pump head in accordance with various embodiments of the present invention, depicting the pump head in a locked configuration.
Figure 4B:
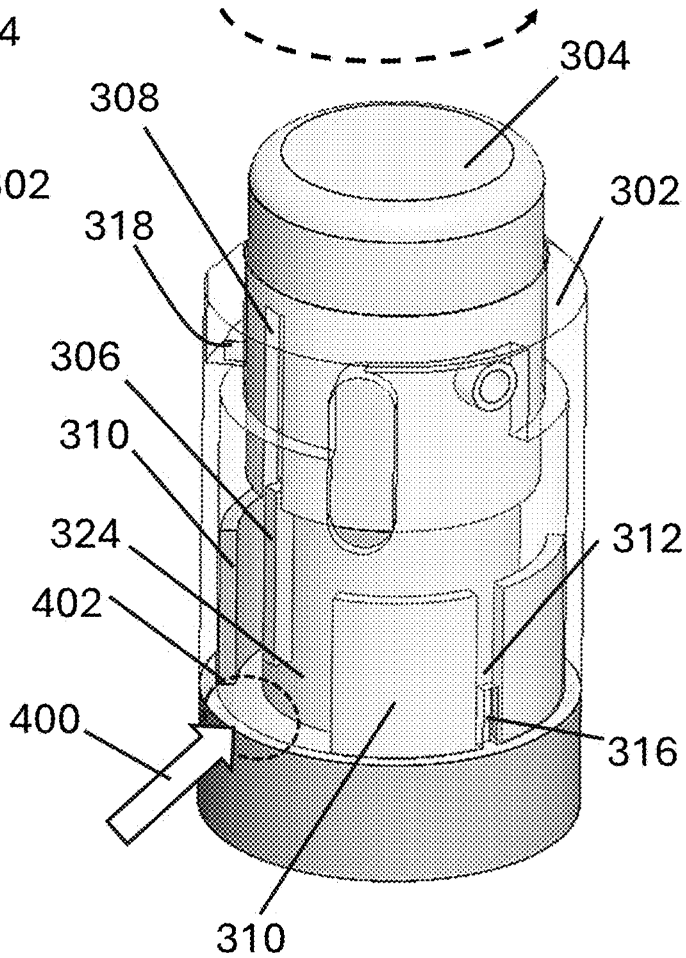
FIG. 4B is an interior-view illustration of a pump head in accordance with various embodiments of the present invention, depicting the pump head in a locked configuration.
Figure 4C:
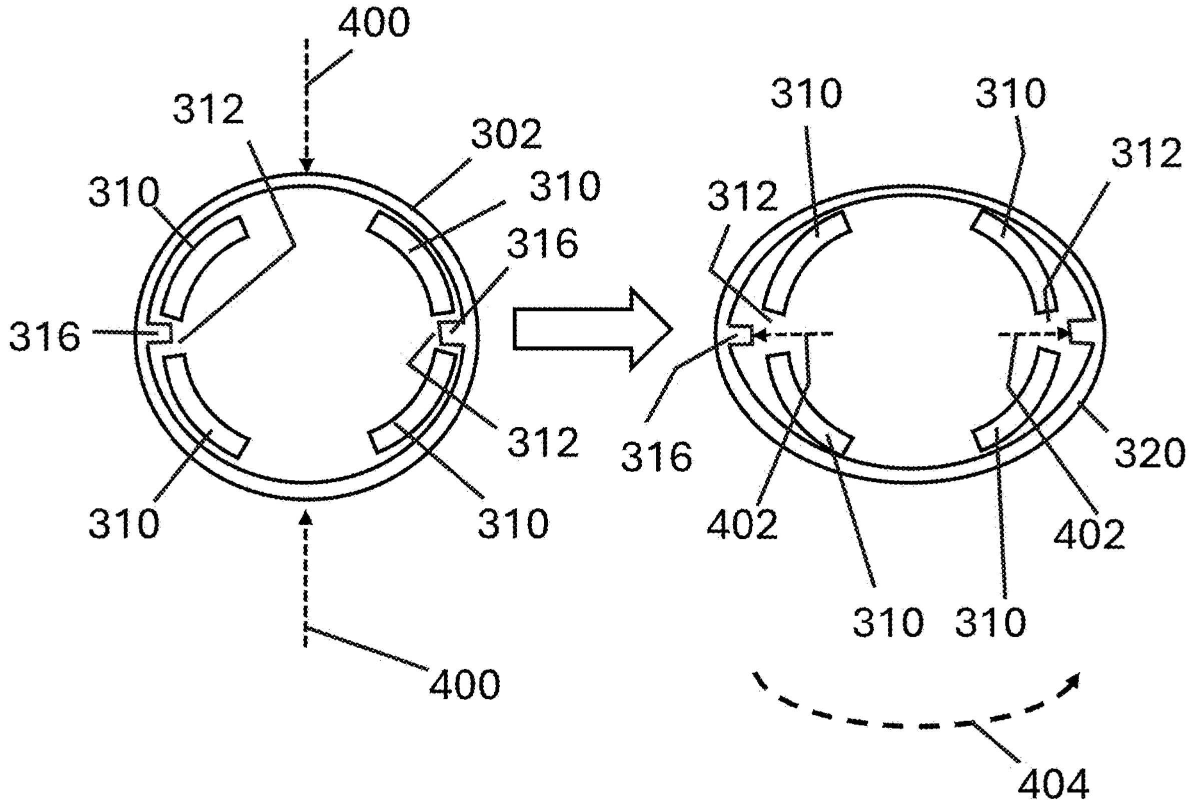
FIG. 4C is a cross-sectional, top-view illustration of the base component and outer shell.

As shown between FIGS. 4A and 4B, when in the locked configuration, the blocking latch 318 rests upon the blocking ledge 314. Since the block latch 318 extends over to rest upon the blocking ledge 314, the actuator component 304 is essentially locked and prevented from being depressed to pump fluid. In order to unlock the pump head, a user can selectively depress 400 (e.g., through squeezing) a depressible portion 402 of the outer shell 302. For example, the user can press inward with their fingers on the depressible portions 402 on opposing sides of the outer shell 302. The deform gaps 324 between the deform guards 310 allow for the outer shell 302 (formed of a flexible material such as plastic) to flex inward and, in doing saw, withdraw the locking ribs 316 from base slots 312. In other words and as shown in the top-view illustration of FIG. 4C, depressing 400 opposing sides of the outer shell 302 causes the outer shell 302 to deform its shape and ovalize (i.e., take the form of an oval instead of a circle). Through deformation, the locking ribs 316 are withdrawn 402 from the base slots 312 in the deform guards 310. With the locking ribs 316 withdrawn 402, the outer shell 302 is free to rotate 404 with respect to the base component and into the unlocked position.

Referring again to FIG. 4B, also shown are the one or more alignment guides 306 (e.g., ridges) that align and engage with corresponding alignment slots 308 on the actuator component 304. As noted above, the alignment guides 306 prevent the actuator component 304 from rotating with respect to the base component 300 while still allowing a sliding relationship between the two components 306 and 304.

Figure 5A:
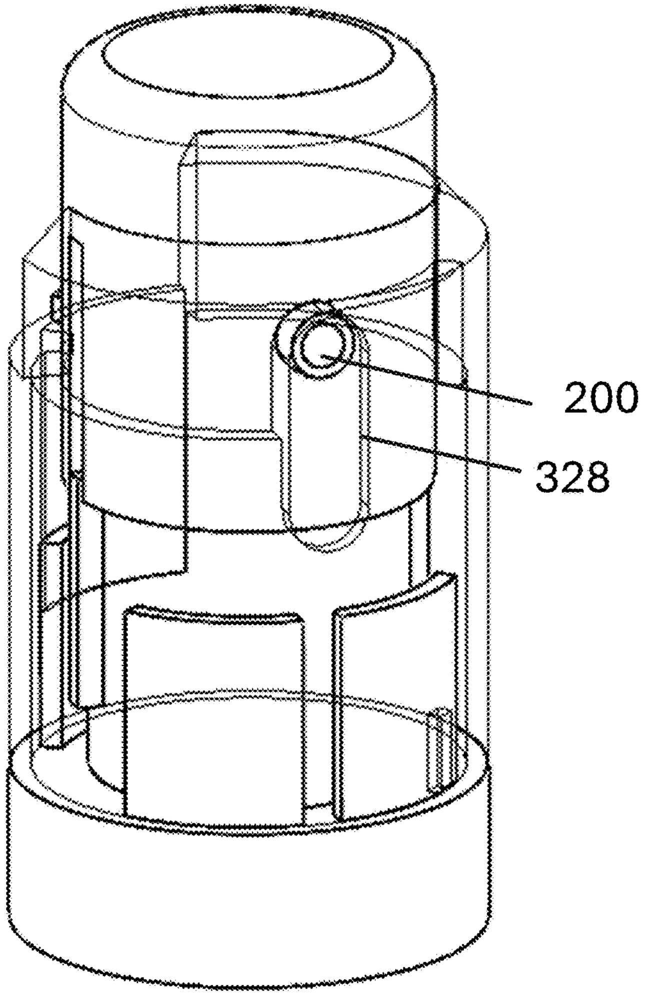
FIG. 5A is an interior-view illustration of the pump head in accordance with various embodiments of the present invention, depicting the pump head in an unlocked configuration, ready to be depressed and pumped.
Figure 5B:
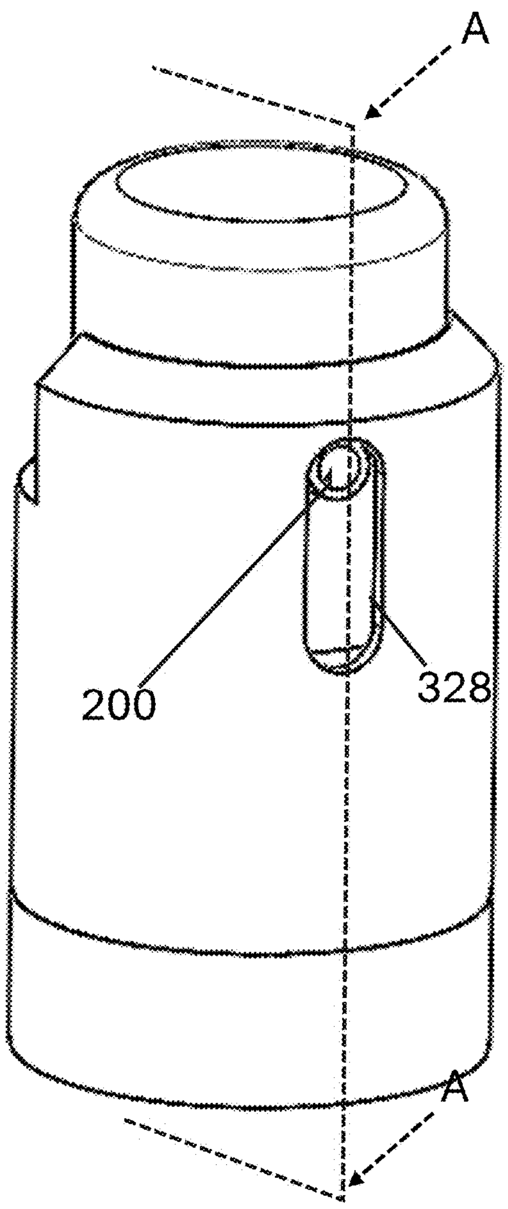
FIG. 5B is an elevated-view illustration of the pump head in accordance with various embodiments of the present invention, depicting the pump head in an unlocked configuration, ready to be depressed and pumped.
Figure 5C:
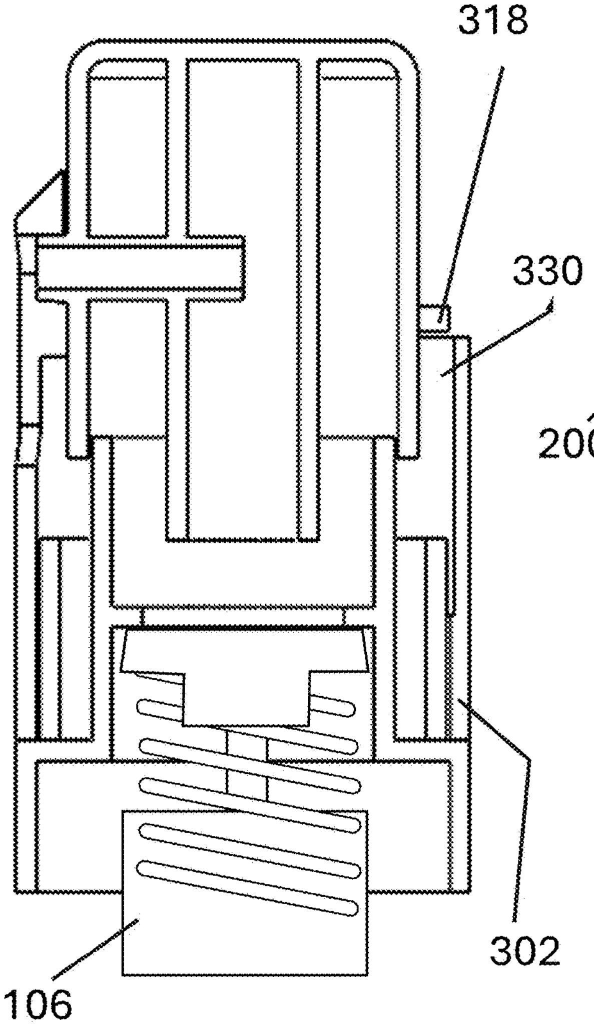
FIG. 5C is a cross-sectional, side-view illustration of the pump head, taken from line A-A of FIG. 5B, depicting the pump head in an unlocked configuration, ready to be depressed and pumped.

FIGS. 5A through 6E depict the pump head in the unlocked configuration. As shown in FIGS. 5A and 5B, when in the unlocked configuration, the dispensing aperture 200 is aligned with the dispenser slide slot 328. Notably and referring to FIG. 3C, the outer shell 302 is formed to include a vertical channel 330 adjacent to the blocking ledge 314. As shown in the cross-sectional illustrations of FIGS. 5C and 5D, when the outer shell 302 is rotated into the unlocked configuration, the blocking ledge 314 is rotated such that the blocking latch 318 no longer resides on the blocking ledge 314, with the blocking latch 318 now aligned with the vertical channel 330.

Figure 5D:
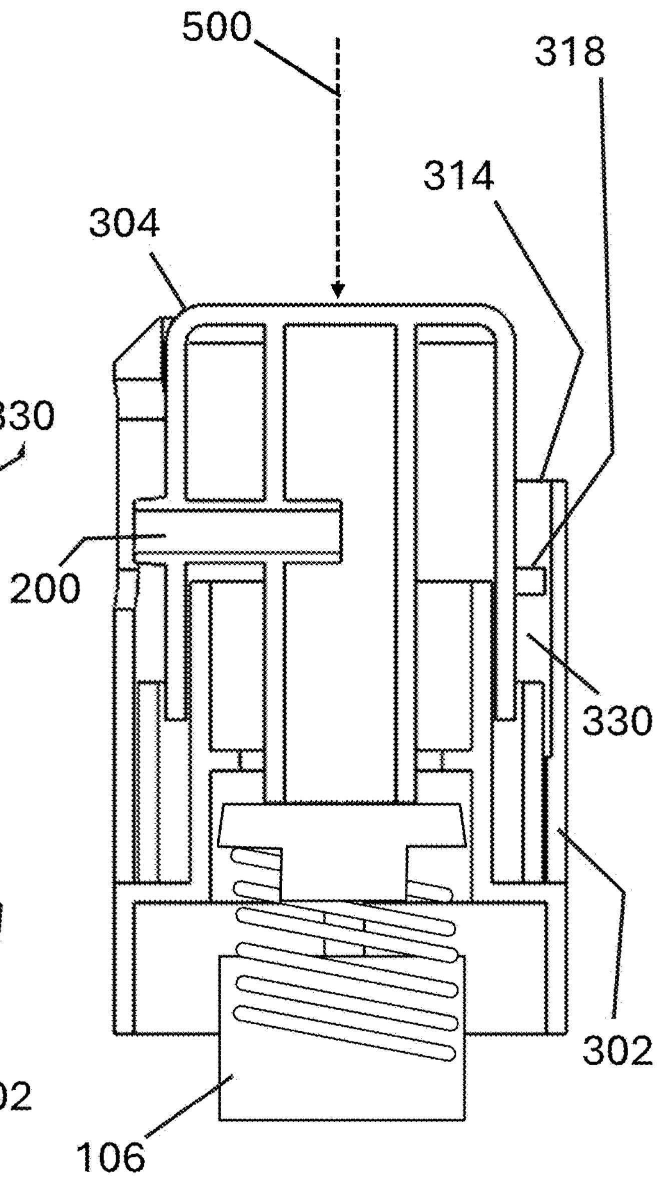
FIG. 5D is a cross-sectional, side-view illustration of the pump head, taken from line A-A of FIG. 5B, depicting the pump head in an unlocked configuration and fully depressed.

When in the unlocked configuration, normal pumping operations can be initiated as the actuation component 304 is depressed 500 (as shown in FIG. 5D) with the blocking latch 318 sliding freely downward within the vertical channel 330. Pumping of the actuation component 304 causes the actuation component 304 to engage with the pump assembly 106 and draw the fluid or medicine from the container and through the dispensing aperture 200 for delivery. For further understanding, FIGS. 6A through 6E illustrate various viewpoints of the pump head 102 in the unlocked configuration.

Figure 7:
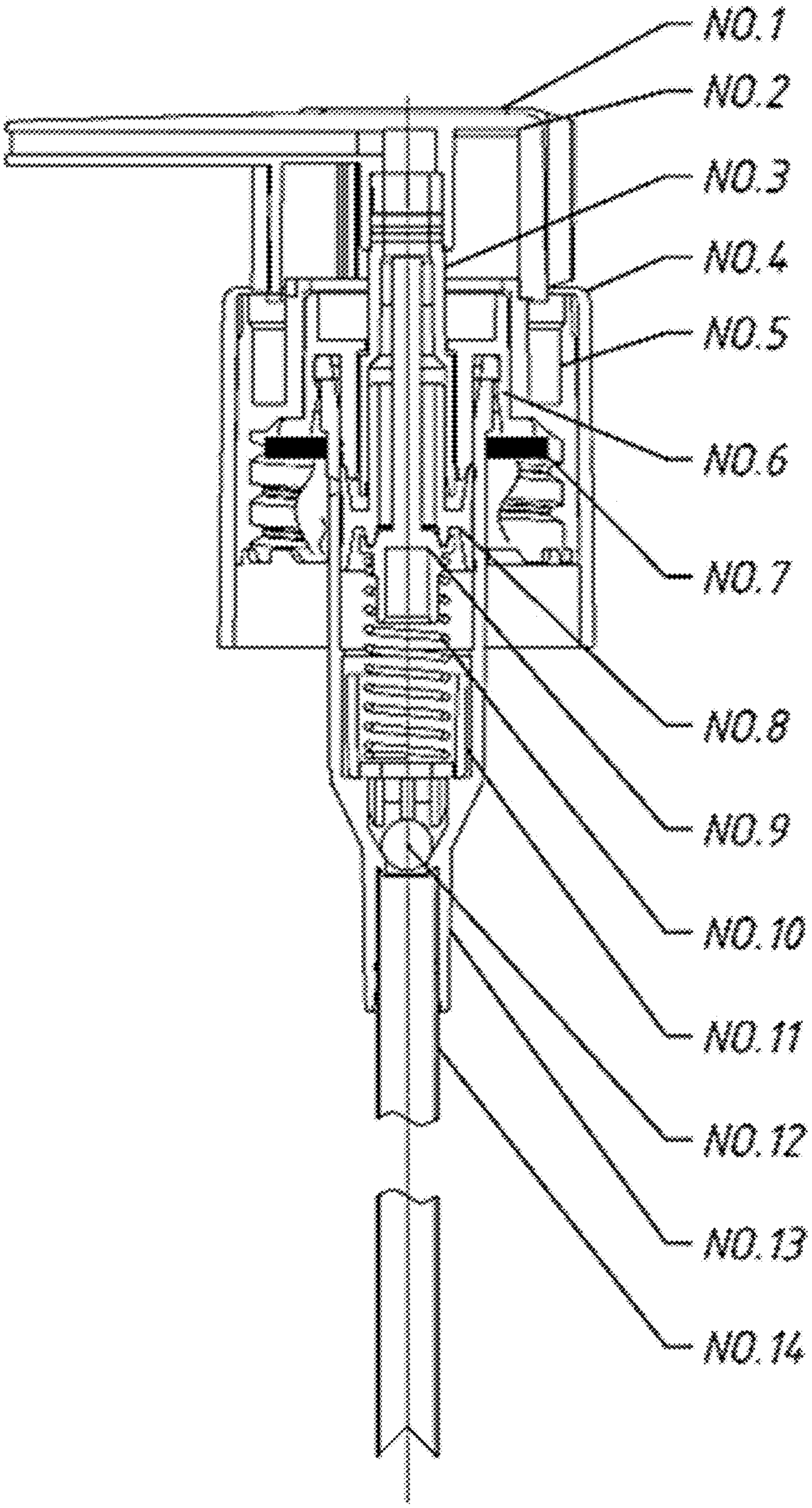
FIG. 7 (Prior Art)
FIG. 7 is an illustration of a pump mechanism according to the prior art.
Figure 8:
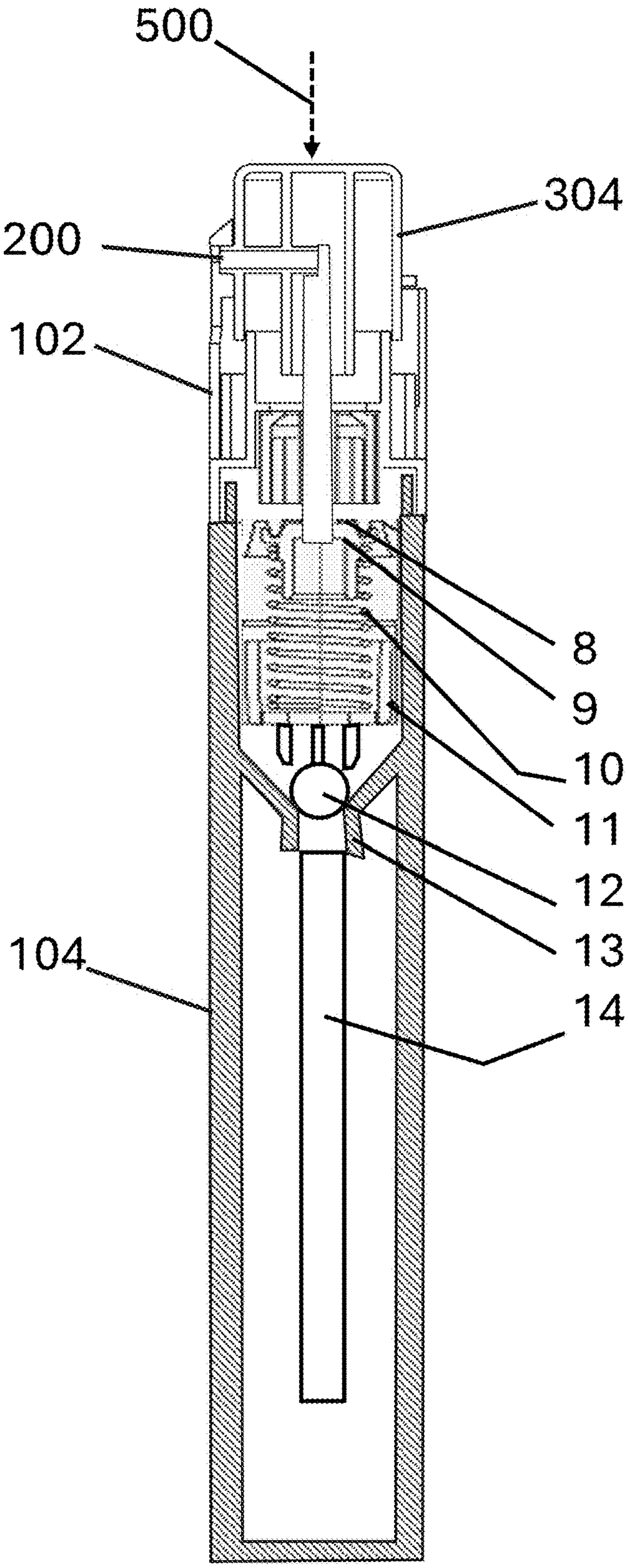
FIG. 8 is a cross-sectional, side-view illustration of a pump dispenser according to various embodiments of the present invention, depicting an example pump mechanism connected to the pump head.

As noted above, when unlocked, the pump head 102 is operable for engaging with and activating a pump assembly 106 to dispense fluid or medicine from the pump dispenser. The pump assembly 106 is any suitable assembly that can be affixed with a container and pump head 102 (of the present disclosure) to allow for pumping or otherwise dispensing a medication or fluid therefrom, a non-limiting example of which includes a compression or spring-loaded pump, similar to the pump mechanism as used in a standard lotion bottle. For reference, FIG. 7 provides an illustration of an example pump assembly as provided for in the prior art, while FIG. 8 provides a non-limiting example of the pump assembly 106 as modified and applied to the present invention. The pump assembly of the prior art (as shown in FIG. 7) includes a clamp 1, press head 2, press lever 3, coat 4, screw cap 5, connect cap 6, gasket 7, piston 8, piston seat 9, spring 10, spring seat 11, valve 12, housing 13, and a straw 14.

As applied to the present invention (as depicted in FIG. 8), the pump assembly 106 is connected with and between the pump head 102 and container 104. When the pump head 102 is in the unlocked configuration, the actuation component 304 can be pressed downward 500 to press down the piston 8 and force the fluid through the straw 14 and out of the dispensing aperture 200. In some instances the pump assembly 106 can be screwed onto the container 104; however, it should be understood that the invention is not intended to be limited thereto as the pump assembly 106 can be attached in any suitable manner between the container 104 and pump head 102 to allow for dispensing fluid from the container 104 and out of the dispensing aperture 200. Further, it should be understood that the specific pump assembly 106 as depicted in FIG. 8 is provided as a non-limiting example of a suitable pump assembly and that the invention is not intended to be limited thereto as other mechanisms or assemblies can be used to dispense the fluid upon actuation. For example, the pump assembly can be formed as an airless pump, a peristaltic pump, a diaphragm pump, a pressurized canister style pump, or any other configuration in which activation of the assembly (via the pump head 102) causes the fluid to dispense.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A pump dispenser having a safety lock pump head, comprising:

a container for containment of a fluid therein;

a pump head attached to the container, the pump head having a locked configuration and an unlocked configuration;

a pump assembly attached with and between the container and pump head; and wherein the pump head comprises a base component, an actuator component slidably connected to the base component, and a deformable outer shell rotatably connected to the base component and actuator component, the outer shell being deformable to allow the outer shell to rotate and transition from the locked configuration to the unlocked configuration, such that when in the locked configuration the pump head is locked and prohibited from dispensing and when the outer shell is deformed and then rotated into the unlocked configuration, the pump head is operable for actuating the pump assembly and dispensing fluid from the container.

2. The pump dispenser as set forth in claim 1, wherein the base component includes one or more base slots and an inner wall of the outer shell includes one or more locking ribs, such that each locking rib resides within a base slot in the locked configuration.

3. The pump dispenser as set forth in claim 2, wherein the outer shell includes one or more depressible portions, such that upon depression of the depressible portions, the outer shell deforms its shape and, in doing so, each locking rib is withdrawn from the base slot to allow a user to selectively rotate the outer shell to transition from the locked configuration to the unlocked configuration.

4. The pump dispenser as set forth in claim 3, wherein the outer shell includes a blocking ledge and the actuator component includes a blocking latch that selectively resides upon the blocking ledge, wherein when upon the blocking ledge, the actuator component is in the locked configuration and prevented from being depressed to actuate the pump assembly.

5. The pump dispenser as set forth in claim 4, wherein the outer shell includes a vertical channel adjacent to the blocking ledge, such that when the outer shell is rotated into the unlocked configuration, the blocking ledge is rotated away from the blocking latch such that the blocking latch is aligned with the vertical channel to allow for selective pumping of the actuator component.

6. The pump dispenser as set forth in claim 5, wherein the base component includes one or more alignment guides that align and engage with corresponding alignment slots on the actuator component, such that the alignment guides prevent the actuator component from rotating with respect to the base component while allowing a sliding relationship between the actuator component and the base component.

7. The pump dispenser as set forth in claim 6, wherein the base component also includes a pair of opposing deform guards separated by a deform gap that allows for deformation of the outer shell to selectively unlock the pump head.

8. The pump dispenser as set forth in claim 7, wherein the one or more base slots are formed through the pair of opposing deform guards.

9. The pump dispenser as set forth in claim 1, wherein the outer shell includes a blocking ledge and the actuator component includes a blocking latch that selectively resides upon the blocking ledge, wherein when upon the blocking ledge, the actuator component is in the locked configuration and prevented from being depressed to actuate the pump assembly.

10. The pump dispenser as set forth in claim 9, wherein the outer shell includes a vertical channel adjacent to the blocking ledge, such that when the outer shell is rotated into the unlocked configuration, the blocking ledge is rotated away from the blocking latch such that the blocking latch is aligned with the vertical channel to allow for selective pumping of the actuator component.

11. The pump dispenser as set forth in claim 1, wherein the base component includes one or more alignment guides that align and engage with corresponding alignment slots on the actuator component, such that the alignment guides prevent the actuator component from rotating with respect to the base component while allowing a sliding relationship between the actuator component and the base component.

12. The pump dispenser as set forth in claim 1, wherein the base component also includes a pair of opposing deform guards separated by a deform gap that allows for deformation of the outer shell to selectively unlock the pump head.

13. The pump dispenser as set forth in claim 12, wherein the base component includes one or more base slots and the one or more base slots are formed through the pair of opposing deform guards.

* * * * *